G. AVRUNIN.
BEARING.
APPLICATION FILED JUNE 4, 1915.

1,188,712.

Patented June 27, 1916.
2 SHEETS—SHEET 1.

Witnesses
Karl H. Butler
Anna M. Dorr

Inventor
George Avrunin
By
Attorneys

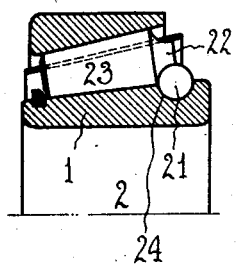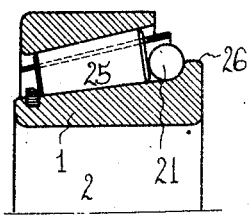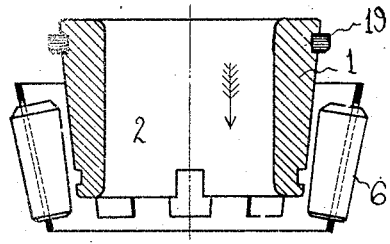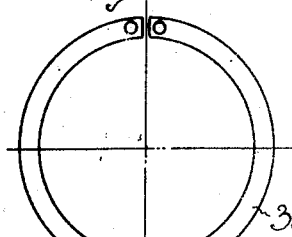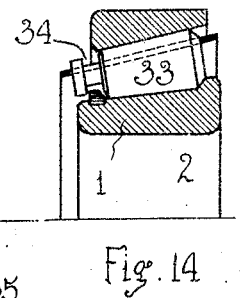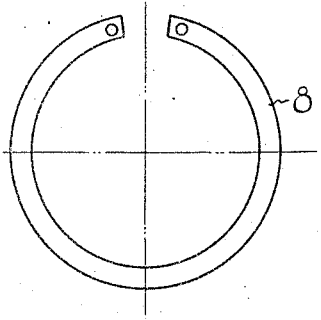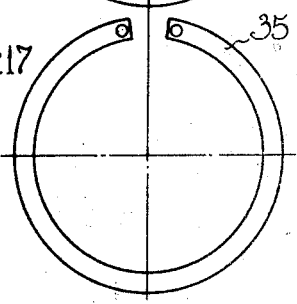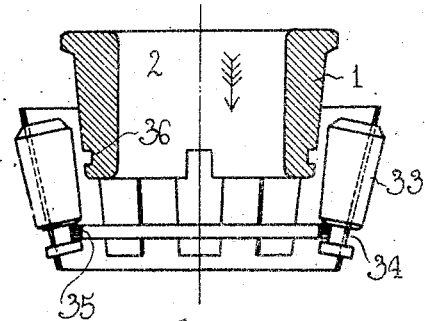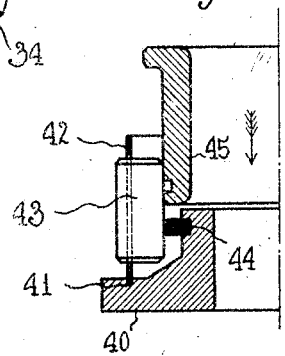

UNITED STATES PATENT OFFICE.

GEORGE AVRUNIN, OF DETROIT, MICHIGAN.

BEARING.

1,188,712. Specification of Letters Patent. Patented June 27, 1916.

Application filed June 4, 1915. Serial No. 32,064.

*To all whom it may concern:*

Be it known that I, GEORGE AVRUNIN, a citizen of the United States of America, residing at Detroit, in the county of Wayne and State of Michigan, have invented certain new and useful Improvements in Bearings, of which the following is a specification, reference being had therein to the accompanying drawings.

This invention relates to roller bearings, and more particularly to that type of roller bearings commonly known to the trade as the "Timken bearing" and generally used in connection with axles and other vehicle elements. In this and other types of roller bearings, for instance straight or cylindrical rollers, numerous tedious operations are necessary to accurately and properly assemble the rollers of the bearing, and it is the principal object of this invention to eliminate operations requiring skill and carefulness by providing a roller bearing with rollers that can be expeditiously and economically assembled, insuring accurate alinement, proper spacing and precluding any danger of jamming and breaking when subjected to an excessive load.

Another object of my invention is to provide a taper or conical roller bearing possessing considerable load carrying ability, the rollers of the bearing being disposed to insure a uniform distribution of a load and afford end thrust bearings for any longitudinal movement of the load sustaining rollers.

A further object of my invention is to provide a bearing embodying a bearing cone, conical rollers, a cage, and an outer bearing member or collar, said bearing cone and collar being adjustable whereby either may be shifted to compensate for wear of the conical rollers.

The above are a few of the objects attained by using my improved bearing, and reference will now be had to the drawings, wherein—

Figure 1:
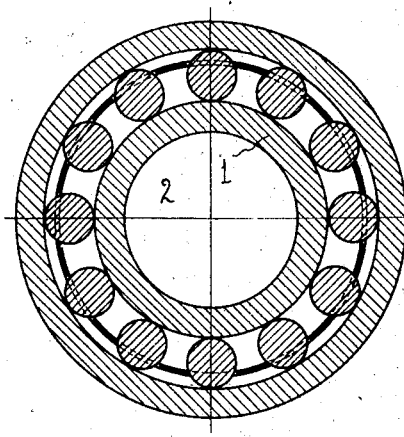
Figure 2:
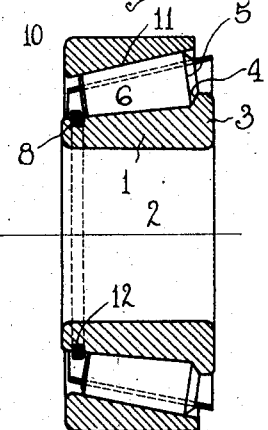
Figure 3:
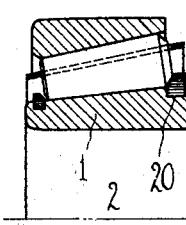
Figure 4:
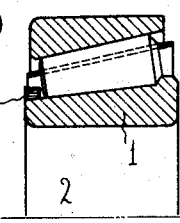
Figure 5:
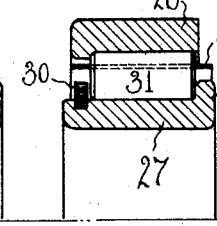
Figure 6:
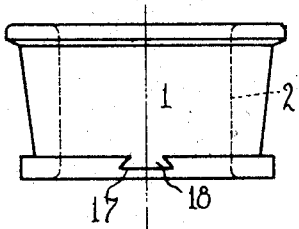
Figure 8:
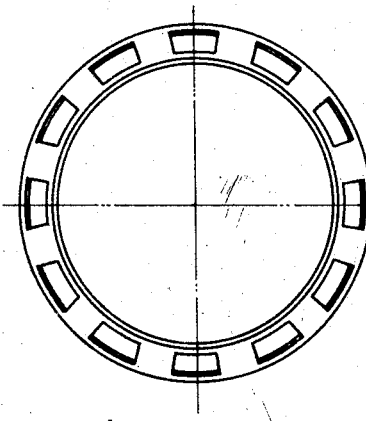
Figure 9:
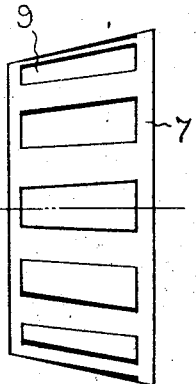
Figure 7:
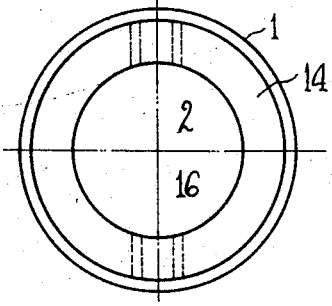

Figure 1 is a cross sectional view of the preferred form of roller bearing; Fig. 2 is a longitudinal sectional view of the same; Fig. 3 is a longitudinal sectional view of a portion of a roller bearing having a detachable abutment and a detachable retaining ring; Fig. 4 is a similar view of a bearing having a permanent abutment and retaining ring; Fig. 5 is a similar view of a bearing having a permanent abutment and a detachable retaining ring in connection with cylindrical or straight rollers; Fig. 6 is a plan of the bearing illustrating a modified form of retaining ring; Fig. 7 is an end view of the same; Fig. 8 is an end view of a detached cage; Fig. 9 is a side elevation of the same; Fig. 10 is a longitudinal sectional view of a portion of a conical roller bearing showing a roller neck engaging a movable abutment; Fig. 11 is a similar view of a bearing showing another arrangement of a movable abutment; Fig. 12 is a similar view of a bearing illustrating the manner of assembling rollers and applying the same to bearing cone; Fig. 13 is an elevation of a detached retaining ring; Fig. 14 is a longitudinal sectional view of a portion of a bearing, showing neck rollers; Fig. 15 is a longitudinal sectional view of the same type of bearing illustrating the manner of assembling the neck rollers; Figs. 16, 17 and 18 are elevations of a retaining ring used in connection with the bearing illustrated in Fig. 15, and Fig. 19 is a longitudinal sectional view of a bearing, showing the use of an assembling member for cylindrical or straight rollers.

In describing my invention by aid of the views above referred to, I desire to point out that the same are merely illustrative of examples whereby my invention may be applied in practice, and I do not care to confine myself to the precise construction and arrangement of parts shown. The following description is therefore to be broadly construed as including substitute constructions and arrangement of parts which are the obvious equivalent of those to be hereinafter referred to.

Throughout the drawings, the reference numeral 1 generally denotes a bearing cone having a concentric opening 2 for an axle or other member (not shown). The bearing cone 1 has the periphery tapering from one end of the cone to the opposite end thereof, and reference will now be had to Figs. 1, 2, 8 and 9 showing the preferred form of construction.

The bearing cone 1 has the large end thereof provided with a permanent abutment or flange 3 presenting an annular beveled shoulder 4 engaged by the beveled large ends 5 of a plurality of conical rollers 6 spaced upon the tapering periphery of the bearing cone. To maintain the conical rollers 6 in spaced relation upon the bearing 1 a conical cage 7 is employed and to prevent accidental displacement of the rollers and the cage a retaining ring 8 is placed upon the small end of the bearing cone.

The cage 7 is made of sheet metal, as steel, brass or such material that can be stamped or pressed, by one or two operations, to form a shell having longitudinal equally spaced openings 9, each of less area than the longitudinal sectional area of a conical roller, whereby when the rollers are assembled in the cage, preparatory to placing the bearing cone in the cage, the rollers cannot pass through the openings 9, but simply rest in the cage with a portion of each roller protruding through the openings of the cage. To assemble the conical rollers the small end of the cage 7 is held in a horizontal plane and the conical rollers placed in the openings 9 of the cage, the rollers resting in said opening by reason of the walls of the cage slanting away from or being disposed at an angle relative to the vertical axis of the cage when held in an upright position. Considerable importance is attached to this manner of assembling the rollers in the cage as the operation can be expeditiously performed. A bearing cone can then be placed in the cage with the periphery of the bearing engaging the periphery of the conical rollers. The retaining ring 8 can then be placed in position and the rollers are held relative to the bearing cone whereby the same can be handled as a unit and placed in an outer bearing member or collar 10, which has a tapering annular bearing surface 11 engaging the rollers 6.

As shown in Figs. 1, 2 and 3, the small end of the bearing cone 1 has an annular groove 12 to receive the retaining ring 8, said ring being split to facilitate its installation. This retaining ring is simply employed to prevent accidental displacement of the rollers and does not receive any end thrust of the rollers when the bearing is in use.

As shown in Fig. 4, the retaining ring can be pressed on or otherwise secured to the bearing cone 1, the ring in this instance being designated 13 and fitting snugly upon the periphery of the bearing cone.

As shown in Figs. 6 and 7 the ring may be in the form of a cap 14 provided with a central opening 16 registering with the opening 2 of the bearing cone. The cap has dove-tailed grooves 17 adapted to receive dove-tail tongues 18 carried by the small end of the bearing cone. This construction permits of the retaining ring being easily and quickly removed if occasion so requires.

In Fig. 3 there is illustrated a detachable abutment 19 in the form of a ring fitted in a groove 20 provided therefor in the large end of the bearing cone, and in some instances I can use a movable abutment in the form of anti-frictional balls 21, as shown in Figs. 10 and 11. In Fig. 10, the anti-frictional balls 21 engage necks 22 of conical rollers 23, and said anti-frictional balls are arranged in a race 24 at the large end of the bearing. In Fig. 11, the anti-frictional balls 21 are disposed between flat ends of rollers 25 and a flange 26 on the bearing cone.

Fig. 5 illustrates coöperating cylindrical bearing members 27 and 28, a permanent abutment 29, a detachable retaining ring 30, cylindrical or straight rollers 31, and a cylindrical cage 32, all of these elements being easily assembled and the rollers 31 having practically the same load carrying ability as the conical rollers previously described. By referring to Fig. 19 it will be observed that a core 40 facilitates assembling the cylindrical rollers and that a bearing cone follows the core, thus preventing displacement of the cylindrical rollers, which are spaced by the cylindrical cage 32.

Fig. 12 clearly indicates the manner of assembling the conical rollers preparatory to placing the same in engagement with a bearing cone, and it is to be noted that the conical rollers are approximately the length of the bearing cone. In other words, there is one cage for each bearing cone and the size and shape of the conical rollers are conducive to rapid assembling in a cage. It is an extremely easy matter to place the bearing cone in the cage to rest upon the rollers, and then spring the retaining ring into position to hold the cage relative to the bearing cone, thus permitting of the same being handled as a unit and slipped into an outer bearing member or collar. This cannot be accomplished on account of the construction of a great many roller bearings, consequently I am able to materially reduce the working force and expense heretofore necessary for assembling the parts of a roller bearing. I am aware cages have heretofore been used in bearings, but in every instance the production of the cages required a multiplicity of operations on account of retaining flanges, etc., whereas my improved cage can be produced by one or two operations.

A further modification of my invention is illustrated in Figs. 14 to 18 inclusive, showing a bearing cone, wherein conical rollers 33 have the small ends provided with annular grooves 34 forming necks and adapted to engage in the grooves of said rollers is a retaining ring 35. After the rollers are assembled in a cage, the retaining ring, which is split with normally overlapping ends, as shown in Fig. 16, is placed in the cage to engage in the grooves 34 of the rollers. By holding the ring distended, as shown in Fig. 17, the bearing cone can be placed in the cage, and when released as shown in Figs. 14 and 16 the retaining ring assumes the position shown in Fig. 18 and enters the annular groove 36 in the cone bearing 1. It is therefore apparent that this retaining ring serves two purposes, that of holding the rollers 33 in a cage, and that of engaging the bearing cone 1 to preclude any possibility of the rollers twisting out of alinement on the bearing cone.

In Fig. 19 there is shown an assembling member 40 having a groove 41 for a cylindrical or straight cage 42 adapted to receive rollers 43. The rollers are held in position by a resilient ring 44 forming part of the member 40, and said member gives way to a bearing cone 45 which is slipped into position.

What I claim is:—

1. A roller bearing comprising a bearing-cone, said bearing-cone having the small end thereof provided with an annular groove, a plurality of rollers on said bearing-cone and having ends thereof provided with annular grooves, and a retaining ring adapted to be distended to engage in the grooves of the rollers and then released to engage in the grooves of said bearing-cone.

2. A roller-bearing comprising a bearing-cone having the large end thereof provided with an annular abutment and the small end thereof with an annular groove, conical rollers on said bearing-cone having ends thereof engaging the abutment of said bearing-cone and ends thereof provided with annular grooves, a cage spacing said conical rollers on said bearing cone, and a retaining ring adapted to be distended to engage in the grooves of said conical rollers whereby said bearing-cone can be placed in position, said retaining ring when released engaging in the groove of said cone to coöperate with the annular abutment thereof in preventing longitudinal displacement of said conical rollers.

3. In a roller bearing, a cage, rollers in said cage, a bearing cone, and means adapted to hold said rollers in said cage until said bearing cone is placed in engagement with said rollers and engage said bearing cone to maintain said bearing cone within said cage.

4. A roller bearing comprising a bearing member, said bearing member having an end thereof provided with an annular groove, a plurality of rollers on said bearing member and having ends thereof provided with annular grooves, and a retaining ring adapted to be distended to engage in the grooves of the rollers and then released to engage in the groove of said bearing member.

In testimony whereof I affix my signature in presence of two witnesses.

GEORGE AVRUNIN.

Witnesses:
KARL H. BUTLER,
ANNA M. DORR.